United States Patent
Lv et al.

(10) Patent No.: US 9,377,577 B2
(45) Date of Patent: Jun. 28, 2016

(54) BACKLIGHT MODULE AND HEAT-DISSIPATING DEVICE

(71) Applicant: Shenzhen China Star Optoelectronics Technology Co., Ltd., Shenzhen, Guangdong (CN)

(72) Inventors: Chengling Lv, Shenzhen (CN); Pangling Zhang, Shenzhen (CN); Guofu Tang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 164 days.

(21) Appl. No.: 14/232,902

(22) PCT Filed: Jan. 7, 2014

(86) PCT No.: PCT/CN2014/070223
§ 371 (c)(1),
(2) Date: Jan. 14, 2014

(87) PCT Pub. No.: WO2015/089922
PCT Pub. Date: Jun. 25, 2015

(65) Prior Publication Data
US 2015/0185407 A1    Jul. 2, 2015

(30) Foreign Application Priority Data

Dec. 20, 2013   (CN) .......................... 2013 1 0706601

(51) Int. Cl.
F21V 8/00    (2006.01)

(52) U.S. Cl.
CPC ............ *G02B 6/0085* (2013.01); *G02B 6/0088* (2013.01)

(58) Field of Classification Search
CPC ....... G02B 6/0085; G02B 6/0088; F21V 8/00
See application file for complete search history.

(56) References Cited

U.S. PATENT DOCUMENTS

| | | | |
|---|---|---|---|
| 7,452,121 B2* | 11/2008 | Cho et al. ....................... 362/633 |
| 2010/0066937 A1* | 3/2010 | Yamashita et al. ............... 349/58 |
| 2011/0149602 A1* | 6/2011 | Lee et al. ....................... 362/612 |
| 2011/0249470 A1* | 10/2011 | Lin et al. ....................... 362/612 |
| 2011/0292682 A1* | 12/2011 | Yu et al. ........................ 362/609 |
| 2012/0014135 A1* | 1/2012 | Kim .................. G02F 1/133615 362/623 |
| 2013/0308340 A1* | 11/2013 | Que et al. ....................... 362/612 |

FOREIGN PATENT DOCUMENTS

| | | |
|---|---|---|
| CN | 102374456 A | 3/2012 |
| CN | 102889507 A | 1/2013 |

* cited by examiner

*Primary Examiner* — Elmito Breval
(74) *Attorney, Agent, or Firm* — Andrew C. Cheng

(57) ABSTRACT

The present invention relates to a technology of displaying device, and more particularly to a heat-dissipating device of a backlight module, and which is arranged between a backframe and a waveguide of the backlight module for dissipating heat generated from a light source disposed adjacent to the waveguide, wherein the heat dissipating device includes a master heatsink, and an auxiliary heatsink; and wherein the master heatsink has a sidewall extending from an end thereof to in connection to the waveguide, and the auxiliary heatsink is arranged between the master heatsink and the waveguide. The present invention further provides a backlight module incorporated with such a heat-dissipating device. With the combination of the master heatsink and the auxiliary heatsink, a novel heat-dissipating device is created and which effectively upgrades the heat-dissipating performance under the high power density, prolonging the service life of the light source, and the increases the optical characteristic of the displaying device.

13 Claims, 2 Drawing Sheets

BACKLIGHT MODULE AND HEAT-DISSIPATING DEVICE

FIELD OF THE INVENTION

The present invention relates to a technology of displaying device, and more particularly, to an improvement to a heat-dissipating device of a backlight module.

DESCRIPTION OF PRIOR ART

Currently, in order to increase the characteristics of the brightness and penetration of the liquid crystal displaying device, the power density of the backlight module has configured bigger and bigger, and in turn, it brings up higher and higher heat. Accordingly, effectively and quickly dissipating the heat built-up thereof becomes an imminent issue. The power density is related to the power of the light strip and the distance between the LEDs. The use of high power light strip and smaller distance between LEDs can all bring up the power density. Currently, the heat-dissipating device mounted within the backlight module is used to transfer the heat generated from the light source to the backframe at one hand so as to reduce the heat conduction to the waveguide. On the other hand, the heat-dissipating device presents an obvious temperature gradient. On the heat-dissipating device, the closer to the light source, the more heat absorbed thereof, and it presents a higher temperature, while the portion distant to the light source, the temperature of the heat-dissipating device becomes cooler. However, this kind of traditional, single heat-dissipating device cannot longer meet the requirements of the backlight module which incorporated with power density arrangement. Simply increasing the thickness and width of the heatsink is not cost-effective as the requirements of machining are high, while the utilization of the material is low. In light of this, there is a need to provide an improvement to the existing heat-dissipating device.

SUMMARY OF THE INVENTION

In order to resolve the problem encountered by the prior art, the present invention provides a heat-dissipating device for backlight module. With the versatile arrangement and combination of a master heatsink and an auxiliary heatsink, the heat built-up in the backlight module can be effectively dissipated.

This heat dissipating device is arranged between a backframe and a waveguide of the backlight module for dissipating heat generated from a light source disposed adjacent to the waveguide, wherein the heat dissipating device includes a master heatsink, and an auxiliary heatsink.

Wherein the master heatsink has a sidewall extending from an end thereof to in connection to the waveguide, and the auxiliary heatsink is arranged between the master heatsink and the waveguide.

Furthermore, wherein a distance between the auxiliary heatsink and the sidewall of the master heatsink is about 10~15 mm.

Furthermore, wherein the interconnection between the auxiliary heatsink and the master heatsink is by way of adhesive, welding or blot.

Furthermore, wherein a heat conductive layer is arranged between the auxiliary heatsink and the master heatsink.

Furthermore, wherein the auxiliary heatsink is covered with a heat insulative layer so as to block a heat transfer to the waveguide.

Furthermore, wherein the heat conductive layer is made from grapheme, and the heat insulative layer is made from plastic or rubber.

Furthermore, wherein there is a gap created between the auxiliary heatsink and the waveguide.

Furthermore, wherein a non-heat-conductive support is arranged between the sidewall and a middle of the master heatsink so as to securely support the waveguide so as to keep the gap in uniform.

Furthermore, characterized in that the auxiliary heatsink is provided with a vent duct.

Furthermore, wherein the vent has a rectangular shape or polygonal shapes with closed contour, the vent has openings at ends for communication with atmosphere.

Furthermore, wherein the master heatsink and/or auxiliary heatsink is made from aluminum sheet or aluminum extrusion.

The present invention further provides a backlight module including a backframe, and a light source, a heat dissipating device and a waveguide mounted on an internal side of the backframe, wherein the light source is arranged opposite to a side of the waveguide; wherein the heat-dissipating device is arranged between the backframe and the waveguide for dissipating heat generated by the light source, wherein the heat dissipating device is a heat dissipating device recited above.

The advantages can be reached.

1. The present invention incorporates both the master heatsink and the auxiliary heatsink which increase the heat-dissipating rate of the backlight module tremendously under the high power density, prolongs the service life of the light source, and upgrades the optical characteristics.

2. The auxiliary heatsink can be embodied with a variety of configurations and shapes. For example, a vent duct configuration, or alternatively, a high heat-conductive layer and heat-insulative layer can be readily disposed on top and bottom of the auxiliary heatsink, or alternatively, a gap can be provided between the auxiliary heatsink and the waveguide. The provision of the auxiliary heatsink can promote the heat transfer between the master and the auxiliary heatsinks at one hand, and can effectively prevent the heat transferred to the waveguide, thereby upgrading the optical characteristics.

3. The master heatsink and the auxiliary heatsink can be interconnected with a variety of manners, while featured a simplified configuration for easy assembling. The material rate is high, and has self-evident economic benefit.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated here below in accompanied drawings. Apparently, with the spirit of the embodiments disclosed, person in the skilled in the art can readily come out with other modifications as well as improvements without undue experiment. In addition, other drawings can be readily achieved based on the disclosed drawings. Wherein.

DETAILED DESCRIPTION OF DRAWINGS

Figure 1:
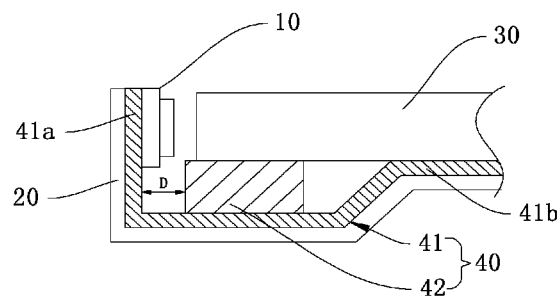
FIG. 1 is a partial configurational view of a backlight module made in accordance with a first embodiment of the present invention.

In order clearly explain the technology of the embodiments illustrated in the present invention, a brief and concise description will be given along with the accompanied drawings. Apparently, the embodiments illustrated in the drawings are merely some typical embodiments, while should not be construed that the present invention can only be implemented in such manner. To the contrary, with the provision of the present invention, those embodiments will become more complete and thorough, and fully demonstrates the scope of the embodiments of the present invention to the skill in the art. In the accompanied drawings, identical element will be marked with same numeral reference.

Embodiment 1

As shown in FIG. 1, the present invention provides a backlight module which includes a backframe 20 and a light source 10, a waveguide 30 and a heat dissipating device 40 mounted on internal side of the backframe 20. The light source 10 is arranged opposite to the waveguide 30, and the heat-dissipating device 40 is arranged between the backframe 20 and the waveguide 30 so as to dissipate heat generated by the light source 10. Substantially, the heat-dissipating device 40 includes a master heatsink 41 and an auxiliary heatsink 42 incorporated with the master heatsink 41.

Wherein the master heatsink 41 includes a sidewall 41a extending from an end thereof and then interconnect to a backside of the light source 10. The master heatsink 41 includes an embossed middle portion 41b to support a middle portion of the waveguide 30. By this arrangement, an end of the waveguide 30, which is located adjacent to the light source 10, is cantilevered over the light source 10. This configuration can effectively prevent a portion of the master heatsink 41, which receives mostly of the heat generated from the light source, from in contact with the waveguide 30 such that the temperature of the waveguide is unwanted increased.

Meanwhile, the auxiliary heatsink 42 is disposed on a bottom of the waveguide 30 and between the sidewall 41a and the middle portion 41b of the master heatsink 41 so as to facilitate quick heat dissipation in this portion. In the current embodiment, the auxiliary heatsink 42 provides a support to an end of the waveguide 42 and which also contributes stabilization to the overall shape of the waveguide 30.

Wherein, the auxiliary heatsink 42 can not be put too close to the sidewall 41a of the master heatsink 41 as well as the light source 10 mounted on the sidewall 41a; however, it should not be put too far so as to lose its function of heat dissipating as well as function of supporting the waveguide 30. In order to bring a balance to the heat dissipating as well as the supporting, it is preferably to have the distance D between the sidewall 41a of the master heatsink 41 and the auxiliary heatsink 42 ranges from 10~15 mini-meters (mm).

Wherein the master heatsink 41 and the auxiliary heatsink 42 are preferably made from high heat-conductive material so as to quickly dissipate the heat built-up thereof. For example, the master heatsink 41 can be preferably selected from aluminum alloy 1050, while the auxiliary heatsink 41 can be preferably selected from aluminum alloy 5052 or aluminum extrusion 6063.

Figure 2:
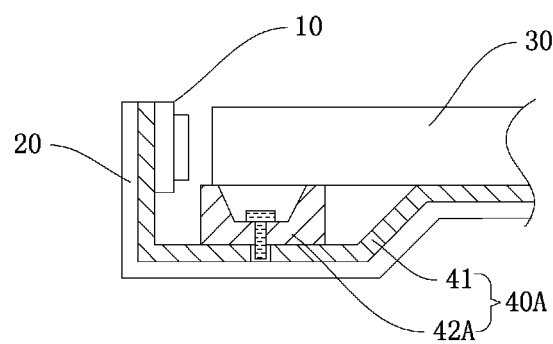
FIG. 2 is another partial configurational view of a backlight module made in accordance with a first embodiment of the present invention.

Furthermore, the master heatsink 41 and the auxiliary heatsink 42 can be interconnected together by ways of adhesive, welding or bolting. On the other hand, the shape of the auxiliary heatsink 42 does not have any special requirement as long as it can be readily assembled and facilitates quick heat dissipating performance. Any shapes are acceptable. As a result, the heat-dissipating device 40 configured accordingly has a plurality of shapes. For example, in FIG. 2, the heat dissipating device 40A is configured with the auxiliary heatsink 42A and the master heatsink 41 which are interconnected together by means of bolt and nut.

Embodiment 2

Figure 3:
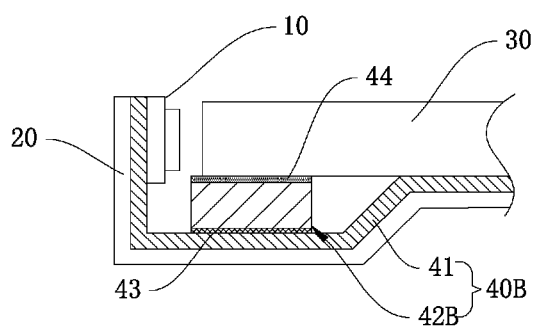
FIG. 3 is a partial configurational view of a backlight module made in accordance with a second embodiment of the present invention.

In this embodiment, the backlight module provided is similar to the backlight module disclosed in Embodiment 1. The difference resides in the heat dissipating device 40B. As shown in FIG. 3, a heat conductive layer 42 is arranged between the auxiliary heatsink 40B and the master heatsink 41 so as to reduce the heat resistance and increase the heat-transferring rate between the master heatsink 41 and the auxiliary heatsink 42B. Furthermore, the auxiliary heatsink 42B is covered with a heat-insulative layer 44 so as to block heat transfer to the waveguide 30. Wherein the heat conductive layer can be made from high heat conductive material such as the grapheme, which has an excellent heat-transferring rate of 5600 w/mk. The heat insulative layer 44 can be made from highly heat insulative material, such as plastic or rubber.

It could be readily appreciated by the skilled in the art that this configuration is not limited to this embodiment only, but properly be implemented to other embodiments as long as there is no interference there between.

Embodiment 3

Figure 4:
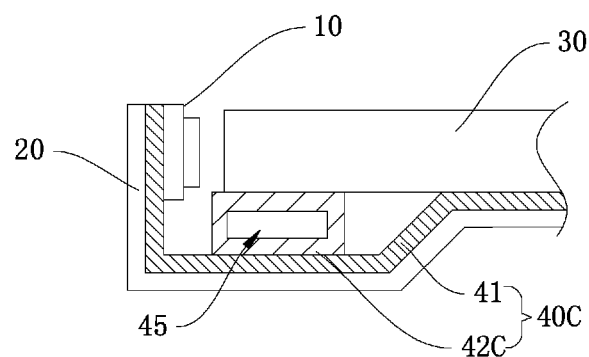
FIG. 4 is a partial configurational view of a backlight module made in accordance with a third embodiment of the present invention.

In this embodiment, the backlight module provided is similar to the backlight module disclosed in Embodiment 1. The difference resides in the heat dissipating device 40C. As shown in FIG. 4, the auxiliary heatsink 42C is incorporated with a vent duct 45. Wherein the vent duct 45 has a hollow rectangular cross section or a polygonal shape, or any other feasible polygonal shape. The vent duct 45 is a close duct with ends open to the atmosphere. With this design, the auxiliary heatsink 42C can quickly absorb heat from the master heatsink 41, while quickly dissipates the absorbed heat to the atmosphere through the vent duct 45. It can effectively prevent the heat being transferred to the waveguide 30. Similarly, this embodiment is not limited to the current embodiment only. If there is no interference, this configuration can be also utilized to other preferred embodiments.

Embodiment 4

Figure 5:
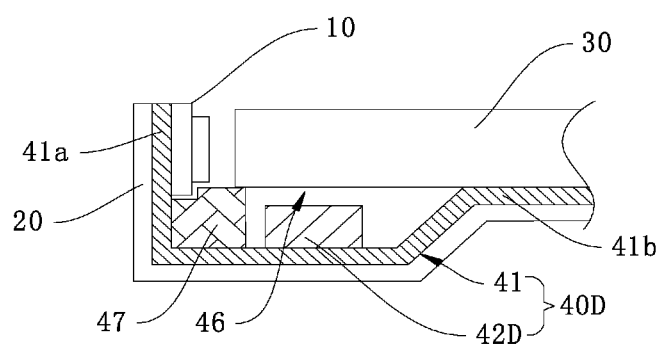
FIG. 5 is a partial configurational view of a backlight module made in accordance with a fourth embodiment of the present invention.

In this embodiment, the backlight module provided is similar to the backlight module disclosed in Embodiment 4. The difference resides in the heat dissipating device 40D. As shown in FIG. 5, a gap 46 is created between the auxiliary heatsink 42D and the waveguide 30. With the gap 46, the auxiliary heatsink 42D will not directly in contact with the waveguide 30 so as to reduce the heat convention from the auxiliary heatsink 42D to the waveguide 30.

Furthermore, with the provision of the gap 46, the end portions of the waveguide 30 can cantilever over the master heatsink 41. However, after a period of usage, the end portions of the waveguide 30 could be bowed down such that the gap 46 becomes smaller and smaller. This will compromise the accuracy of the light beam of the light source 10 projected to the side surface of the waveguide 30. This will damage the performance of the backlight module. Accordingly, a non-heat-conductive support 47 is formed between the sidewall 41a and the middle portion 41b of the master heatsink 41. With the provision of the non-heat-conductive support 47, the overall shape of the waveguide 30 can be properly maintained. As a result, the quality characteristics of the waveguide 30 can be ensured. Wherein the material used to create the non-heat-conductive support 47 is made from rubber which has poor heat conductivity.

Similarly, that this configuration is not limited to this embodiment only, but properly be implemented to other embodiments as long as there is no interference there between.

It could be readily appreciated by the skilled in the art that these embodiments described above can be readily integrated as a whole so as to increase the heat-dissipating efficiency of the heatsink to the light source which is therefore being prolonged for its service life. The quality and performance of the backlight module can also be upgraded, and the optical characteristic can be lifted as well.

The invention claimed is:

1. A heat dissipating device for a backlight module and which is arranged between a backframe and a waveguide of the backlight module for dissipating heat generated from a light source disposed adjacent to an end of the waveguide, wherein the heat dissipating device includes a master heatsink, which is made of a material having a first composition, and an auxiliary heatsink, which is made of a material that has a second composition different from the first composition;
   wherein the master heatsink has a raised portion on which a surface of the waveguide is positioned and supported in such a way that an end of the waveguide that is located close to the light source is spaced from a non-raised portion the master heatsink and a space is defined between the surface of the waveguide and the non-raised portion of the master heatsink; and
   wherein the master heatsink has a sidewall extending from an end thereof to be in connection with the light source and the auxiliary heatsink is arranged in the space defined between the surface of the waveguide and the non-raised portion of the backframe and is located under the surface of the waveguide and between the sidewall and the raised portion of the master heatsink.

2. The heat dissipating device as recited in claim 1, wherein a distance between the auxiliary heatsink and the sidewall of the master heatsink is about 10-15 mm.

3. The heat dissipating device as recited in claim 2, wherein the auxiliary heatsink is connected to the master heatsink by way of adhesive, welding or bolt.

4. The heat dissipating device as recited in claim 1, wherein a heat conductive layer is arranged between the auxiliary heatsink and the master heatsink.

5. The heat dissipating device as recited in claim 4, wherein the auxiliary heatsink is covered with a heat insulative layer so as to block heat transfer to the waveguide.

6. The heat dissipating device as recited in claim 5, wherein the heat conductive layer is made of graphene and the heat insulative layer is made of a plastic or rubber material.

7. The heat dissipating device as recited in claim 1, wherein a gap is created between the auxiliary heatsink and the waveguide.

8. The heat dissipating device as recited in claim 7, wherein a non-heat-conductive support is arranged between the sidewall and a middle of the master heatsink so as to securely support the waveguide and stably keep the gap.

9. The heat dissipating device as recited in claim 1, wherein the auxiliary heatsink is provided with a vent duct.

10. The heat dissipating device as recited in claim 9, wherein the vent duct has a rectangular shape or a polygonal shape with a closed contour, and the vent duct has openings at ends for communication with atmosphere.

11. The heat dissipating device as recited in claim 1, wherein the master heatsink and the auxiliary heatsink are made of aluminum sheets or aluminum extrusions.

12. A heat dissipating device for a backlight module and which is arranged between a backframe and a waveguide of the backlight module for dissipating heat generated from a light source disposed adjacent to an end of the waveguide, wherein the heat dissipating device includes a master heatsink, which is made of a material having a first composition, and an auxiliary heatsink, which is made of a material that has a second composition different from the first composition;
   wherein the master heatsink has a raised portion on which a surface of the waveguide is positioned and supported in such a way that an end of the waveguide that is located close to the light source is spaced from a non-raised portion the master heatsink and a space is defined between the surface of the waveguide and the non-raised portion of the master heatsink;
   wherein the master heatsink has a sidewall extending from an end thereof to be in connection with the light source and the auxiliary heatsink is arranged in the space defined between the surface of the waveguide and the non-raised portion of the backframe and is located under the surface of the waveguide and between the sidewall and the raised portion of the master heatsink; and
   wherein a distance between the auxiliary heatsink and the sidewall of the master heatsink is about 10-15 mm.

13. A backlight module including a backframe, and a light source, a heat dissipating device and a waveguide mounted on an internal side of the backframe, wherein the light source is arranged opposite to a side of the waveguide; wherein the heat dissipating device is arranged between the backframe and the waveguide for dissipating heat generated from a light source disposed adjacent to an end of the waveguide, wherein the heat dissipating device includes a master heatsink, which is made of a material having a first composition, and an auxiliary heatsink, which is made of a material that has a second composition different from the first composition;
   wherein the master heatsink has a raised portion on which a surface of the waveguide is positioned and supported in such a way that an end of the waveguide that is located close to the light source is spaced from a non-raised portion the master heatsink and a space is defined between the surface of the waveguide and the non-raised portion of the master heatsink; and
   wherein the master heatsink has a sidewall extending from an end thereof to be in connection with the light source and the auxiliary heatsink is arranged in the space defined between the surface of the waveguide and the non-raised portion of the backframe and is located under the surface of the waveguide and between the sidewall and the raised portion of the master heatsink.

* * * * *